Patented Apr. 14, 1953

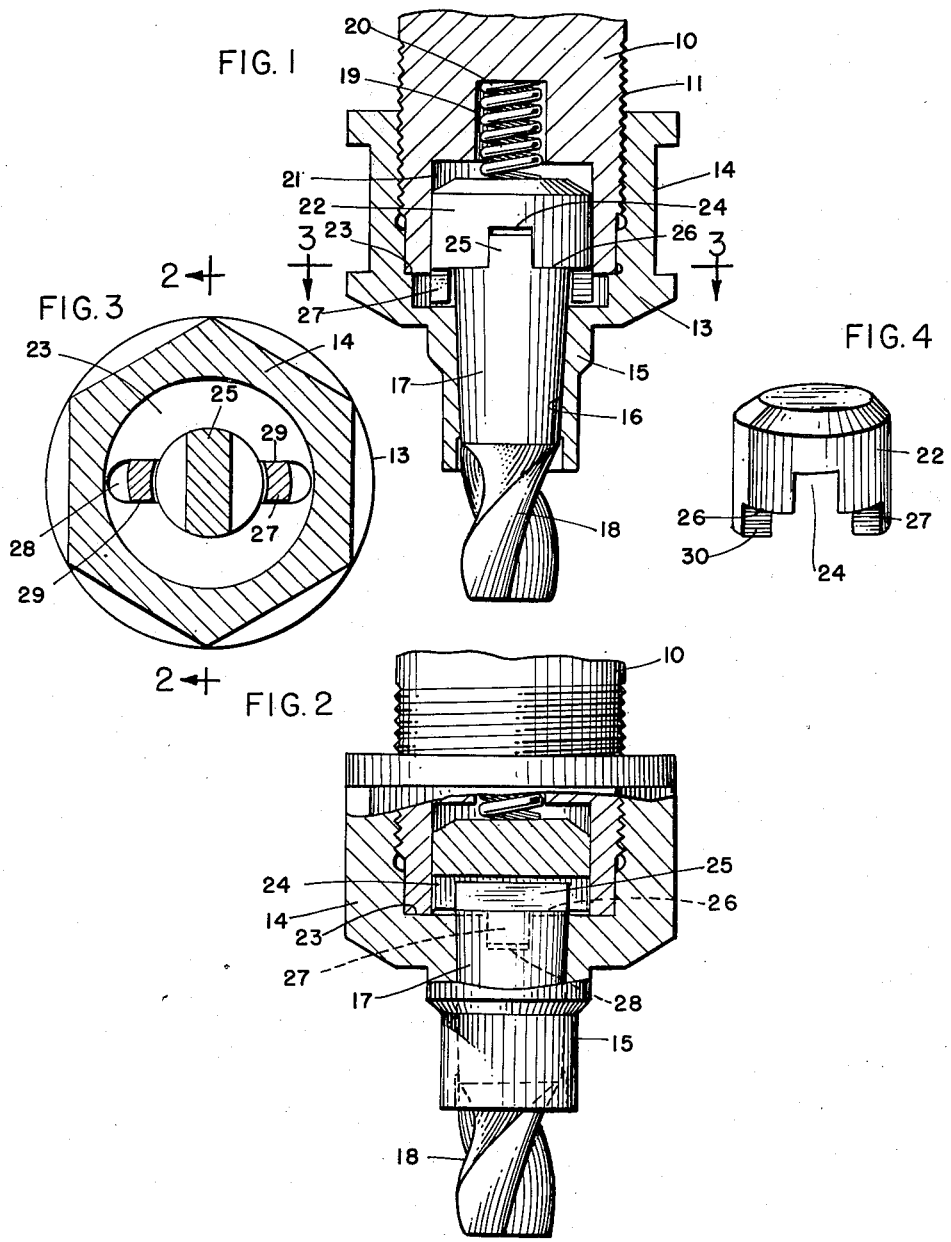

2,634,985

UNITED STATES PATENT OFFICE 2,634,985

CHUCK

Willem Groen, Chicago, Ill., assignor to Onsrud Machine Works, Inc., Chicago, Ill., a corporation of Illinois Application June 11, 1952, Serial No. 292,889

4 Claims. (Cl. 279—103)

This invention relates to tool chucks for drilling and routing machines and is particularly directed to improvements in chucks of the general type described in the patent of Rudolph F. Onsrud No. 2,280,299 issued April 21, 1942.

The main objects of the present invention are to provide improved means for positively driving the tool without possibility of slippage thereof in the chuck and still retain the advantages of the Onsrud construction with respect to security against vibration of the tool within the chuck and with freedom of the tool to shift longitudinally within the chuck to compensate for variations in the relative expansion or contraction of the shank of the tool and tool socket portion of the chuck.

A specific embodiment of this invention is shown in the accompanying drawings, in which:

Figure 1 is an axial section of the chuck showing its relation to the tool which is shown in elevation.

Fig. 2 is an elevation of the same with certain parts shown in section taken on the line 2—2 of Fig. 3.

Fig. 3 is a transverse section taken on the line 3—3 of Fig. 1.

Fig. 4 is a perspective view of the plunger by which spring pressure is transmitted to the tool to wedge it into the tool socket and by which the tool and chuck are interlocked against angular slippage.

In the form shown in the drawings, the operating spindle 10 has external threads 11 for receiving the chuck 13. The chuck 13 has an internally threaded nut portion 14 fitting the threaded end of the spindle and an integral tubular extension 15 which has a conically tapered bore 16 of which the elements converge downwardly or toward the open end of the chuck from which the tool projects. This bore 16 serves as a socket fitting the inversely tapered shank 17 of a cutting tool 18 designed for use in such chuck.

The forward end of the spindle 10, which is the lower end in Fig. 1, has a bore 19, in which is seated a helical compression spring 20, and a cylinder counterbore 21, in which is mounted a driving member 22 in the form of a cylindrical plunger slidably fitting within the bore 21.

The nut portion 14 of the chuck 13 has an annular shoulder 23 at the upper end of the socket 17 for abutment against the lower end of the spindle 10 when the chuck 13 is in operating position thereon.

The driving member 22 has a transverse keyway slot 24 for drivingly receiving a tang 25 on the tool shank 17 and has a shoulder 26 bearing on the inner end of the tool shank 17. The member 22 also has a pair of driving lugs 27 extending below the shoulder 26 and adapted to seat in recesses 28 in the chuck which provide driving shoulders 29 that engage the shoulders 30 provided by the lugs 27. Thus the member 22 is free to rotate and move axially with respect to the spindle but forms a positive driving connection between the tool shank 17 and the chuck.

To insert the tool 18 in the chuck 13, the chuck is unscrewed from the spindle and the tool is then dropped into the socket 16 with its inversely tapered shank in wedging engagement with the walls of the socket 16 and with its tang crosswise of recess 28. Then the member 20 is dropped over the tool and turned about its axis to bring its lugs 27 into the recesses 28 and the tank of the tool 25 into the keyway 24. The nut 14 is then screwed onto the end of the spindle with the spring 20 interposed between the member 22 and the spindle, as shown in Fig. 1.

In operation the spring 20, acting through the plunger 22, forces the tool shank 17 into firm wedging engagement with the tapered socket 16, thus preventing all possibility of lateral vibration of the tool within the chuck. The spring 20 yields to permit such slight axial movement as may be required to compensate for differential expansion of the metal of the tool with respect to that of the chuck.

The keyway 24 and the lugs 27 maintain the angular driving relation between the tool and the chuck, regardless of axial movement of the tool due to such expansion and contraction.

Although but one specific embodiment of this invention is herein shown and described, it will be understood that numerous details of the structure shown may be altered or omitted without departing from the spirit of the invention as defined by the following claims.

I claim:

1. The combination of a spindle, a chuck secured to said spindle and having an axially disposed conically tapered tool socket convergent toward its outer end, a plunger axially interposed between said spindle and chuck inward of said socket, a spring between said plunger and spindle and normally urging said plunger toward said socket, said plunger having therein a keyway for a tool shank tang, and coacting shoulders on said plunger and chuck for preventing relative rotation of said plunger with respect to said chuck.

2. The combination of a spindle, a chuck secured to said spindle and having an axially disposed conically tapered tool socket convergent toward its outer end, a plunger axially interposed between said spindle and chuck inward of said socket, a spring between said plunger and spindle and normally urging said plunger toward said socket, said plunger having therein a keyway for a tool shank tang, a driving shoulder on said plunger spaced radially outward beyond said socket, and a shoulder on said chuck positioned for driving contact with said driving shoulder.

3. The combination of a spindle, a chuck threaded on said spindle and having a conically tapered tool receiving socket axially disposed and tapering convergently away from the spindle, a plunger axially slidable between said spindle and socket, a spring normally urging said plunger away from said spindle, said plunger having a keyway for receiving a tang of a tool mounted in said socket, and coacting shoulders on said plunger and chuck for preventing relative rotation of said plunger with respect to said chuck.

4. A chuck comprising a body part threaded to receive a spindle and having a tapered tool socket with walls converging toward the outer end of said chuck, a plunger at the inner end of said socket and a spring between said plunger and spindle for normally urging said plunger toward said socket, said plunger having non-rotative and axial sliding connection with said chuck and having a keyway positioned for non-rotative engagement with a tang on the inner end of a tool seated in said socket.

WILLEM GROEN.

References Cited in the file of this patent

UNITED STATES PATENTS

| Number | Name | Date |
|---|---|---|
| 2,280,299 | Onsrud | Apr. 21, 1942 |
| 2,345,495 | Onsrud | Mar. 28, 1944 |